Patented Mar. 27, 1951

2,546,428

UNITED STATES PATENT OFFICE 2,546,428

METHOD OF KEEPING THE MEAT OF SHELL-FISH IN A FRESH CONDITION

George Clifford Byrd, Crisfield, Md.

No Drawing. Application February 21, 1950,
Serial No. 145,584

7 Claims. (Cl. 99—195)

My invention relates to a method of keeping or preserving the meat of shellfish in a fresh and edible condition for varying periods or lengths of time, and the product resulting therefrom.

The object and purpose of my invention is to keep in a fresh and safely edible condition the meat of prepared shellfish or crustaceans, such as crabs, lobsters and the like, for a year or less. By "prepared" is meant meat from such crustaceans which has been removed from the crust-like shell or scab of crustacea and cleaned, and "a fresh condition" means that there are no marked changes in flavor, appearance, odor or texture after treatment by my method.

Another object of the invention is to provide a novel and simple method or process for treating fresh meat of crustaceous or shellfish such as crabs, lobsters, shrimp and the like free from contamination, putrefaction or discoloration, and safely edible, which can be carried out in an economical, efficient and practical manner to produce a relatively uniform product which is practically free of bacterial contamination or spoilage and may be kept in such condition by refrigeration or cold storage at practical temperatures in a cold storage plant, store or home from 31° F. to 40° F. for periods from a month to a year and still be safe to eat.

The need for such a process is pronounced since many thousands of dollars worth of shellfish are spoiled or destroyed yearly due to its very perishable nature. It is known that the spoilage or perishability is caused by bacterial contamination and enzymatic reaction, which is accompanied by offensive odor, thus rendering the same unsafe to eat. Due to illness caused by or at least blamed on the contamination of shellfish, much money has been paid yearly for damages claimed as a result thereof, which the present invention is devised to prevent. Therefore, the need is twofold, first, from an economic standpoint, and, second, from a medical standpoint.

Today, some shellfish meat, particularly that of crab, is sold in a processed form, but the characteristics of the meat are changed and rendered less palatable and desirable from the viewpoint of the epicurean. This is somewhat due to the fact that in canning the fresh crabmeat, the processor first treats the meat chemically in order to keep the meat from discoloring or turning dark or black upon processing the same. This is caused by the chemical reaction of sulfides in the meat. Moreover, when anything is added, as in such processing, the meat no longer can be called "fresh," whereas, in accordance with the method I present, the meat is kept fresh in the generally accepted use of the term, and the desirable aroma and flavor thereof retained for periods up to a year.

In practicing the present method or process, it was known that bacteria belonging to the following genera were found in crabs, crabmeat, and other crustaceans, namely; Escherichia, Proteus, Zopfius, Alcaligines, Flavobacterium, Achromobacter, Pseudomonas, Micrococcus, Sarcina, Streptococcus and Staphylococcus. Therefore, it was evident that in order to keep such meat in a fresh condition, it was necessary to find the thermal death point for the bacteria found in the meat under treatment, so as to render such bacteria inactive, thus eliminating objectionable reactions and changes in the characteristics of the fresh meat caused by the bacteria.

Next, it was necessary to determine how high a temperature the meat could withstand before discoloration took place. It is generally known that from 150° F. on, enzymes are rapidly killed or inactivated. So, beginning with the 150° F. point, and taking bacteria counts before and after treatment, and after storage periods, the recommended temperatures hereinafter given were found to be the ones required to kill or inactivate the bacteria and enzymes found to be present in the meat and not cause any changes therein. Then, with proper refrigeration temperatures, the periods of storage mentioned were found to be possible. The better the condition of the meat before treatment, the better is the finished product.

In accordance with my method, after determining the thermal death point for the bacteria found in a large quantity of prepared and picked fresh crabmeat, the meat is treated as follows:

First, the meat acceptable to the trade as fresh was packed in containers, such as glass, parchment lined, enameled tins, or any other suitable construction which can be hermetically sealed after being vacuumized.

Second, the containers or cans so packed are vacuumized by any known method, if possible, but, if not, are packed more tightly in order to reduce to the minimum undesirable air space between the particles of crab meat. The containers are then hermetically sealed.

Third, the meat in the sealed containers is heated by any suitable method to bring the temperature substantially uniformly throughout the internal mass of meat within a range of from 171° F. to 210° F., depending on the character of the meat, degree of freshness, genera or species and count of bacteria and enzymes found therein; the temperature possible without discoloration or actual steaming or cooking but killing or inactivating such bacteria and enzymes. This heating is preferably done by immersing the packed, vacuumized or non-vacuumized and sealed cans into water heated to 210° F. until the temperature in the center of the mass in the cans reaches the desired point between 171° F. and 210° F. depending on the length of time which it is desired to preserve or keep the meat in a fresh condition, such as between a month and a year.

The temperature to which the meat is raised and subjected may be determined in any suitable way, as by inserting a thermometer in a test can immersed in the heated water with the other cans being treated.

Fourth, when the desired temperature is reached, the cans and contents are cooled as quickly as possible, particularly that which is treated from 190° F. or higher, and are then stored at temperatures of from 31° F. to 40° F. Quick cooling can be accomplished by submerging the cans in a tank of cold water, icing, or by merely running a stream of cold water from a hose thereon. As soon as the containers can be comfortably handled, the containers should be refrigerated and kept refrigerated, at temperatures between 30° F. and 40° F. until ready for use.

*Example*

A large number of cans of fresh shellfish or crabmeat, about 3,000 pounds, were treated and successfully kept intact as to the quality of fresh meat up to nine months or a year without any objectionable change. The meat was acceptable to the trade as fresh meat. However, it is recommended that the meat be kept no longer than is necessary to distribute the same to the trade and consumer. Of these 3,000 pounds, 2,000 pounds were purchased from different producers, and, consequently, were packed under different conditions. It is to be noted that the meat as received had been picked and packed in containers but had not been subjected to any processing, such as disclosed by the present invention, in order to increase its keeping qualities. The bacteria load varied and some of the meat was rather old and heavily laden with bacteria. This meat packed in cans as stated was immersed in water heated to 200° F., and when the temperature in the center of the cans reached 190° F., 1,000 cans were removed and cooled as by a stream of cold water. When the temperature reached 195° F. in the center, 500 more cans were removed and cooled, and when the temperature reached 200° F. in the center, the other cans were removed from the heated water. The temperature of the heated water varied from 195° F. to 210° F., or below the boiling point thereof, under which meat might have been termed cooked or steamed, but such temperature was lowered to 200° F. as quickly as possible.

The results were that the bacteria count at the end of nine months often gave a negative reading, and the percentage of spoilage from souring was 12 cans, or .006 per cent.

Of 1,000 other cans, using the same procedure, a temperature range from 171° F. to 210° F. was used, heating to bring the temperature throughout the internal mass of meat within a range of from 171° F. to 200° F., the length of time desired to preserve the meat in a fresh condition governing the degree of temperature used. The following table is recommended for best results:

171° F. for a 1 month holding period
180° F. for a 3 month holding period
190° F. for a 6 month holding period
200° F. for a 9 month holding period
210° F. for a 12 month holding period It was found that the lower the temperature, the greater the percentage of spoilage and at an earlier date. This spoilage was apparently from both bacteria and enzymes or enzymatic reaction as there was a breakdown of cell tissue without any off odor in some cases. Therefore, it was determined that the meat of prepared shellfish can be kept in a fresh condition without objectionable changes in flavor, appearance, odor or aroma, and texture, when treated in accordance with the method or process above set forth for the periods given. The method is not guaranteed to produce a sterilized product such as is sold as canned shellfish or meat, such as is cooked or processed by treating the meat chemically and which is no longer "fresh" in the accepted use of the term. However, the heat ranges specified will kill or inactivate any bacteria or enzymes present in the meat, and by proper refrigeration any inactivation necessary to prevent spoilage will be continued for the periods of time specified. Also, by my method, it is not necessary to alter the fresh condition of the product in any way to prevent changes in the fresh meat characteristics. The fresher and better the quality of the fresh meat used, the better the end product from the treatment. The aforementioned treatment will destroy any and all pathogenic bacteria.

I claim:

1. The method of treating the meat of fresh shellfish to keep the same in a fresh condition for varying periods of time, consisting in packing the meat in a suitable container sealed with a minimum of oxygen present therein, heating the contents of the container at a temperature range from 171° F. to a higher point below the boiling point of water without sterilization of the contents of the container, cooling the container, and then subjecting the container to refrigeration until consumed.

2. The method of treating the meat of fresh shellfish to keep the same in a fresh condition for varying periods of time, consisting in packing the meat in a suitable container, vacuuming and sealing the container, heating the contents of the container within a range of from 171° F. to 210° F. without sterilization of the contents of the container depending on the length of time for which the meat is to be kept in a fresh condition, cooling the container as quickly as possible especially when the temperatures are approximately in the range of 190° F., and then refrigerating the container until used.

3. The method of treating the meat of fresh shellfish to keep the same in a fresh condition for varying periods of time, consisting in packing the meat in a suitable container, vacuuming and sealing the container, heating the contents of the container within a range of from 171° F. to 210° F. without sterilization of the contents of the container depending on the length of time for which the meat is to be kept in a fresh condition, cooling the container and then maintaining the container under refrigeration at a temperature from 31° F. to 40° F.

4. The method of treating the meat of fresh shellfish to keep the same in a fresh condition for varying periods of time, consisting in packing the meat in a suitable container, vacuuming and sealing the container, heating the contents of the container to a point not exceeding 210° F. without sterilization of the contents of the container which will inactivate any bacteria and enzymes present in the meat, cooling the container, and then keeping the container under refrigeration at sufficiently low temperatures ranging from 31° F. to 40° F. to continue any inactivation of said bacteria and enzymes necessary to prevent spoilage.

5. The method of treating the meat of fresh shellfish to keep the same in a fresh condition for varying periods of time, consisting in packing the meat in a suitable container, vacuuming and sealing the container, heating the contents of the container by immersion in water heated to raise the temperature in the center of the mass of meat at a point from 171° F. to a point below the boiling point of water without sterilization of the meat, cooling the container, and as soon as the container can be comfortably handled, subjecting the container to and keeping the same under refrigeration at from 31° F. to 40° F. until opened for consumption.

6. The method of treating the meat of fresh shellfish to keep the same in a fresh condition for varying periods of time, consisting in packing the meat in a suitable container which will not have a deleterious effect on the meat, vacuumizing the container to remove a maximum of oxygen therefrom, hermetically sealing the container, immersing and heating the meat in the container within a range from 171° F. to 210° F. without sterilization of the meat, cooling the container and contents by contact of a cooling medium with the outside of the container, and then maintaining the container under refrigeration at a temperature range between 31° F. and 40° F. until prepared for consumption.

7. The method of treating the meat of fresh shellfish to keep the same in a fresh condition for varying periods of time, consisting in determining the thermic death point for the bacteria found in the particular meat to be treated, heating the meat in vacuumized and hermetically sealed containers lined to prevent contamination of the meat contained therein while the containers are immersed in water to a temperature not to exceed 210° F. to inactivate such bacteria at the determined death point thereof without sterilization of the meat, cooling the meat by the external application of a cooling medium to the containers with the meat therein, and then refrigerating the meat in the containers to a temperature not to exceed 40° F. to maintain the bacteria inactive.

GEORGE CLIFFORD BYRD.

REFERENCES CITED

The following references are of record in the file of this patent:

UNITED STATES PATENTS

| Number | Name | Date |
| --- | --- | --- |
| 2,027,270 | Fellers | Jan. 7, 1936 |

OTHER REFERENCES

"Bulletin Mem. S-345," February 10, 1938, article entitled "The Alaska Crab Meat Industry" by Norman D. Jarvis, published by Dept. of Commerce, Bureau of Fisheries, Washington, D. C.